United States Patent
Bradwell et al.

(10) Patent No.: US 9,605,354 B2
(45) Date of Patent: Mar. 28, 2017

(54) ELECTROLYTIC RECYCLING OF COMPOUNDS

(75) Inventors: David J. Bradwell, Somerville, MA (US); Sebastian Osswald, Monterey, CA (US); Donald R. Sadoway, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1078 days.

(21) Appl. No.: 13/194,391

(22) Filed: Jul. 29, 2011

(65) Prior Publication Data

US 2012/0034153 A1    Feb. 9, 2012

Related U.S. Application Data

(60) Provisional application No. 61/371,260, filed on Aug. 6, 2010.

(51) Int. Cl.
| | | |
|---|---|---|
| *C25C 3/00* | (2006.01) | |
| *C25C 1/00* | (2006.01) | |
| *C22B 7/00* | (2006.01) | |
| *C25B 1/00* | (2006.01) | |
| *C25C 3/34* | (2006.01) | |

(52) U.S. Cl.
CPC ............... *C25C 1/00* (2013.01); *C22B 7/006* (2013.01); *C25B 1/00* (2013.01); *C25C 3/00* (2013.01); *C25C 3/34* (2013.01); *Y02P 10/234* (2015.11)

(58) Field of Classification Search
USPC ................................................ 205/560–617
See application file for complete search history.

(56) References Cited

U.S. PATENT DOCUMENTS

| | | | |
|---|---|---|---|
| 1,842,254 A | * | 1/1932 | Driggs .......................... 205/47 |
| 3,238,437 A | | 3/1966 | Foster et al. |
| 3,245,836 A | | 4/1966 | Agruss |
| | | (Continued) | |

FOREIGN PATENT DOCUMENTS

| | | | | |
|---|---|---|---|---|
| EP | 0078404 A2 | 5/1983 | ............ | H01M 14/00 |
| EP | 0327959 | 8/1989 | ............ | H01M 10/14 |
| | (Continued) | | | |

OTHER PUBLICATIONS

"Notification of Transmittal of the International Search Report and the Written Opinion of the International Searching Authority, or the Declaration," International filing Date: Jul. 29, 2011, International Application No. PCT/US2011/001342, Applicant: Massachusetts Institute of Technology, Date of Mailing: Oct. 12, 2011, pp. 1-13.

(Continued)

*Primary Examiner* — Arun S Phasge
(74) *Attorney, Agent, or Firm* — Sunstein Kann Murphy & Timbers LLP

(57) ABSTRACT

An electrolytic recycling method recovers two or more component elements of one or more compounds simultaneously. A compound, such as a compound semiconductor, to be recycled is dissolved in a liquid electrolyte. Electrolysis of the dissolved compound recovers component elements simultaneously at respective negative and positive electrodes by reduction and oxidation respectively. The component elements produced may be in respective condensed phases or include a gaseous phase.

26 Claims, 3 Drawing Sheets

(56) References Cited

U.S. PATENT DOCUMENTS

| | | | |
|---|---|---|---|
| 3,419,432 A | | 12/1968 | Hesson |
| 3,419,484 A | * | 12/1968 | Ammerman et al. ........ 205/477 |
| 3,488,221 A | | 1/1970 | Shimotake et al. |
| 3,535,214 A | | 10/1970 | Winand |
| 3,663,295 A | | 5/1972 | Baker |
| 3,716,409 A | | 2/1973 | Cairns et al. |
| 3,775,181 A | | 11/1973 | Ryerson |
| 3,833,421 A | | 9/1974 | Rubischko et al. |
| 3,933,521 A | | 1/1976 | Vissers et al. |
| 4,011,374 A | | 3/1977 | Kaun |
| 4,216,273 A | | 8/1980 | Cadart et al. |
| 4,400,247 A | * | 8/1983 | Ginatta ........................ 205/354 |
| 4,999,097 A | | 3/1991 | Sadoway |
| 5,185,068 A | | 2/1993 | Sadoway |
| 5,476,733 A | | 12/1995 | Coetzer et al. |
| 5,779,877 A | | 7/1998 | Drinkard, Jr. et al. |
| 5,897,685 A | | 4/1999 | Goozner et al. |
| 5,997,718 A | * | 12/1999 | Goozner ................ C22B 3/065 205/560 |
| 6,368,486 B1 | | 4/2002 | Thompson et al. |
| 6,730,210 B2 | | 5/2004 | Thompson et al. |
| 6,733,924 B1 | | 5/2004 | Skotheim et al. |
| 6,767,444 B1 | | 7/2004 | Miller et al. |
| 7,504,017 B2 | | 3/2009 | Cardarelli |
| 7,678,484 B2 | | 3/2010 | Tao et al. |
| 8,178,231 B2 | | 5/2012 | Soloveichik et al. |
| 8,202,641 B2 | | 6/2012 | Winter et al. |
| 8,460,814 B2 | | 6/2013 | Deane et al. |
| 8,764,962 B2 | | 7/2014 | Allanore et al. |
| 9,000,713 B2 | | 4/2015 | Boysen et al. |
| 9,076,996 B2 | | 7/2015 | Bradwell et al. |
| 2007/0215483 A1 | | 9/2007 | Johansen et al. |
| 2008/0023321 A1 | | 1/2008 | Sadoway |
| 2008/0044725 A1 | | 2/2008 | Sadoway et al. |
| 2008/0053838 A1 | | 3/2008 | Yamaguchi et al. |
| 2008/0145755 A1 | | 6/2008 | Iacovangelo et al. |
| 2010/0047671 A1 | | 2/2010 | Chiang et al. |
| 2011/0014503 A1 | | 1/2011 | Bradwell et al. |
| 2011/0014505 A1 | | 1/2011 | Bradwell et al. |
| 2011/0200848 A1 | | 8/2011 | Chiang et al. |
| 2012/0264021 A1 | | 10/2012 | Sugiura et al. |
| 2013/0059176 A1 | | 3/2013 | Stefani et al. |
| 2013/0065122 A1 | | 3/2013 | Chiang et al. |
| 2013/0071306 A1 | | 3/2013 | Camp et al. |
| 2014/0113181 A1 | | 4/2014 | Bradwell et al. |
| 2015/0004455 A1 | | 1/2015 | Bradwell et al. |
| 2015/0015210 A1 | | 1/2015 | Bradwell et al. |
| 2015/0132627 A1 | | 5/2015 | Bradwell et al. |
| 2015/0132628 A1 | | 5/2015 | Bradwell et al. |
| 2015/0214579 A1 | | 7/2015 | Boysen et al. |
| 2015/0303525 A1 | | 10/2015 | Bradwell et al. |

FOREIGN PATENT DOCUMENTS

| | | | |
|---|---|---|---|
| EP | 0343333 | 11/1989 | ............ H01M 2/06 |
| EP | 1096593 | 5/2001 | ............ H01M 10/48 |
| GB | 2009789 A | 6/1979 | |
| JP | 55-53877 | 4/1980 | ............ H01M 10/36 |
| JP | 2001-115369 | 4/2001 | ............ D04H 1/46 |
| WO | WO 2008/105811 A2 | 9/2008 | |
| WO | WO 2011/014242 | 2/2011 | ............ H01M 2/14 |
| WO | WO 2011/014243 | 2/2011 | ............ H01M 2/14 |
| WO | WO 2014/062706 | 4/2014 | ............ H01M 10/50 |
| WO | WO 2014/190318 | 11/2014 | ............ H01M 10/04 |

OTHER PUBLICATIONS

Agruss, "The Thermally Regenerative Liquid-Metal Cell," Journal of the Electrochemical Society, vol. 110, No. 11, pp. 1097-1103, Nov. 1963.

Allanore, "A new anode material for oxygen evolution in molten oxide electrolysis," Nature, vol. 497, pp. 353-356, May 16, 2013.

Allanore, "Features and Challenges of Molten Oxide Electrolytes for Metal Extraction," Journal of The Electrochemical Society, vol. 162, No. 1, pp. E13-E22, Nov. 25, 2014.

Atthey, "A Mathematical Model for Fluid Flow in a Weld Pool at High Currents," J. Fluid Mech.,vol. 98, Part 4, pp. 787-801, 1980.

Bradwell, "Technical and Economic Feasibility of a High-Temperature Self-Assembling Battery," Thesis, Massachusetts Institute of Technology, Department of Materials Science and Engineering, 136 pages, Sep. 2006.

Bradwell, "Liquid Metal Batteries: Ambipolar Electrolysis and Alkaline Earth Electroalloying Cells," Thesis, Massachusetts Institute of Technology, Department of Materials Science and Engineering, 206 pages, Feb. 2011.

Bradwell et al., "Recycling ZnTe, CdTe, and Other Compound Semiconductors by Ambipolar Electrolysis," Journal of the American Chemical Society, vol. 133, pp. 19971-19975, Oct. 28, 2011.

Bradwell et al., "Supporting Information: Recycling ZnTe, CdTe, and Other Compound Semiconductors by Ambipolar Electrolysis," Journal of the American Chemical Society, pp. S1-S8, Oct. 28, 2011.

Cairns et al., "Galvanic Cells with Fused-Salt Electrolytes," AEC Research and Development, Argonne National Laboratory, Chemical Engineering Division, 44 pages, Nov. 1967.

Cairns et al., "High-Temperature Batteries- Research in high-temperature electrochemistry reveals compact, powerful energy-storage cells," Science, vol. 164, No. 3886, pp. 1347-1355, Jun. 20, 1969.

Cubicciotti et al., "Metal—Salt Interactions at High Temperatures: The Solubilities of Some Alkaline Earth Metals in their Halides," Journal of the American Chemical Society, vol. 71, No. 6, pp. 2149-2153, 1949.

Dworkin et al., "The Electrical Conductivity of Solutions of Metals in Their Molten Halides," The Journal of Physical Chemistry, vol. 70, No. 7, pp. 2384-2388, Jul. 1966.

Electroville, Grid-Scale Batteries, ARPA-E, MIT Electroville: High Amperage Energy Storage Device-Energy for the Neighborhood, http://arpa-e.energy.gov/?q=slick-sheet-project/electroville-grid-scale-batteries, 1 page, Accessed Jul. 2, 2015.

U.S. Department of Energy, U.S. Department of Energy Categorical Exclusion Determination Form, ARPA-E, 25A/1089-Electroville: High-Amperage Energy Storage Device-Energy Storage for the Neighborhood, 2 pages, Jan. 15, 2010.

Gay et al., "Lithium/Chalcogen Secondary Cells for Components in Electric Vehicular-Propulsion Generating Systems," Argonne National Laboratory, Argonne, Illinois, ANL-7863, 62 pages, Jan. 1972.

Jarrett et al., "Advances in the Smelting of Aluminum," Aluminum Company of America, Metallurgical Treatises, Warrendale, Pennsylvania: The Metallurgical Society of AIME, pp. 137-157, 1981.

Kim et al., "Electrolysis of Molten Iron Oxide with an Iridium Anode: The Role of Electrolyte Basicity," Journal of The Electrochemical Society, vol. 158, No. 10, pp. E101-E105, Aug. 5, 2011.

Kipouros et al., "Toward New Technologies for the Production of Lithium," JOM, pp. 24-26, May 1998.

Magnuski, Innovations in Energy Storage—Professor Don Sadoway Video, MIT Club of Northern California, https://vimeo.com/20906061, 50 pages, Mar. 8, 2011.

Pongsaksawad et al., "Phase-Field Modeling of Transport-Limited Electrolysis in Solid and Liquid States," Journal of the Electrochemical Society, vol. 154, No. 6, pp. F122-F133, 2007.

Sadoway, "The Electrochemical Processing of Refractory Metals," JOM, pp. 15-19, Jul. 1991.

Sadoway, "New opportunities for waste treatment by electrochemical processing in molten salts," Metals and Materials Waste Reduction, Recovery and Remediation, Edited by K.C. Liddell, R.G. Bautista and R.J. Orth, The Minerals, Metals & Materials Society, pp. 73-76, 1994.

Sadoway, "New opportunities for metals extraction and waste treatment by electrochemical processing in molten salts," J. Mater. Res., vol. 10, No. 3, pp. 487-492, Mar. 1995.

Sadoway, A Technical Feasibility Study of Steelmaking by Molten Oxide Electrolysis, presented at 9th AISI/DOE TRP Industry Briefing Session, 16 pages, Oct. 10, 2007.

Sadoway, "Electrochemical Pathways Towards Carbon-Free Metals Production," presented at GCEP Carbon Management in Manufacturing Industries, 55 pages, Apr. 15, 2008.

(56) References Cited

OTHER PUBLICATIONS

Sadoway, "Innovation in Energy Storage: What I Learned in 3.091 was all I Needed to Know," Video, MIT Technology Day 2010, 53 pages, Jun. 5, 2010.

Shimotake et al., "Bimetallic Galvanic Cells With Fused-Salt Electrolytes," Argonne National Laboratory, Argonne, Illinois, pp. 951-962, 1967.

Shimotake et al., "Secondary Cells with Lithium Anodes and Immobilized Fused-Salt Electrolytes," I&EC Process Design and Development, vol. 8, No. 1, pp. 51-56, Jan. 1969.

Villar, "Assessment of High-Temperature Self-Assembling Battery Implementation based on the Aluminum Smelting Process," Thesis, Massachusetts Institute of Technology, Department of Materials Science and Engineering, 129 pages, Sep. 2010.

Weaver et al., "The Sodium|Tin Liquid-Metal Cell," Journal of the Electrochemical Society, vol. 109, No. 8, pp. 653-657, Aug. 1962.

\* cited by examiner

ELECTROLYTIC RECYCLING OF COMPOUNDS

CROSS-REFERENCE TO RELATED APPLICATIONS

The present application claims the benefit of U.S. Provisional Patent Application Ser. No. 61/371,260, which was filed on Aug. 6, 2010, by David J. Bradwell, et al. for a RECYCLING COMPOUNDS BY MEANS OF AMBIPOLAR ELECTROLYSIS and is hereby incorporated by reference.

BACKGROUND OF THE INVENTION

Field of the Invention

The invention relates to recovering component elements from compounds of two or more elements. In particular, this invention provides electrolytic methods for recycling compound semiconductors.

Background Information

Cadmium telluride (CdTe) is a compound semiconductor which has become the dominant material in thin film photovoltaic solar technology. The component element cadmium is highly toxic. This property and the scarcity of the other component element, tellurium, have raised concerns about broad-scale deployment of CdTe-based devices. Substitution by zinc telluride, proposed as a possible replacement for CdTe, would circumvent the potential public health hazard of CdTe but not address vulnerability to limitations on the rate of tellurium production. Mandatory recycling could mitigate both these concerns, but recycling technologies known for CdTe involve multiple steps and ultimately produce a mixed-metal product that must be still further refined in order to recover component elements in usable form. There is, accordingly, a need for a technique that will recover component elements of a compound in usable forms simultaneously.

SUMMARY OF THE INVENTION

In a method of recovering an element from a compound incorporating at least a first, more electropositive component element and a second, more electronegative component element, a quantity of the compound is first dissolved in a liquid electrolyte. The electrolyte is contained in a housing. A negative electrode and a positive electrode are each in contact with and separated by the liquid electrolyte. Electrons are provided to a negative electrode at which an amount of the first component element is formed by reduction. Electrons are extracted from a positive electrode at which an amount of the second component element is formed by oxidation. The first and second component elements are thus formed simultaneously by electrolysis of the compound dissolved in the electrolyte. The respective amounts of the first and second component elements are then removed from the housing.

In one embodiment, the compound to be recycled is cadmium tellurium, incorporating cadmium and tellurium. Dissolving a quantity of cadmium telluride in the liquid electrolyte forms respective species bearing cadmium and tellurium. The dissolved cadmium telluride is electrolyzed to form an amount of cadmium by reduction at a negative electrode and an amount of tellurium by oxidation at a positive electrode simultaneously. The cadmium and tellurium formed are removed from the housing.

BRIEF DESCRIPTION OF THE DRAWINGS

The foregoing discussion will be understood more readily from the following detailed description of the invention, when taken in conjunction with the accompanying drawings, in which like reference numerals indicate identical or functionally similar elements.

Figure 1:
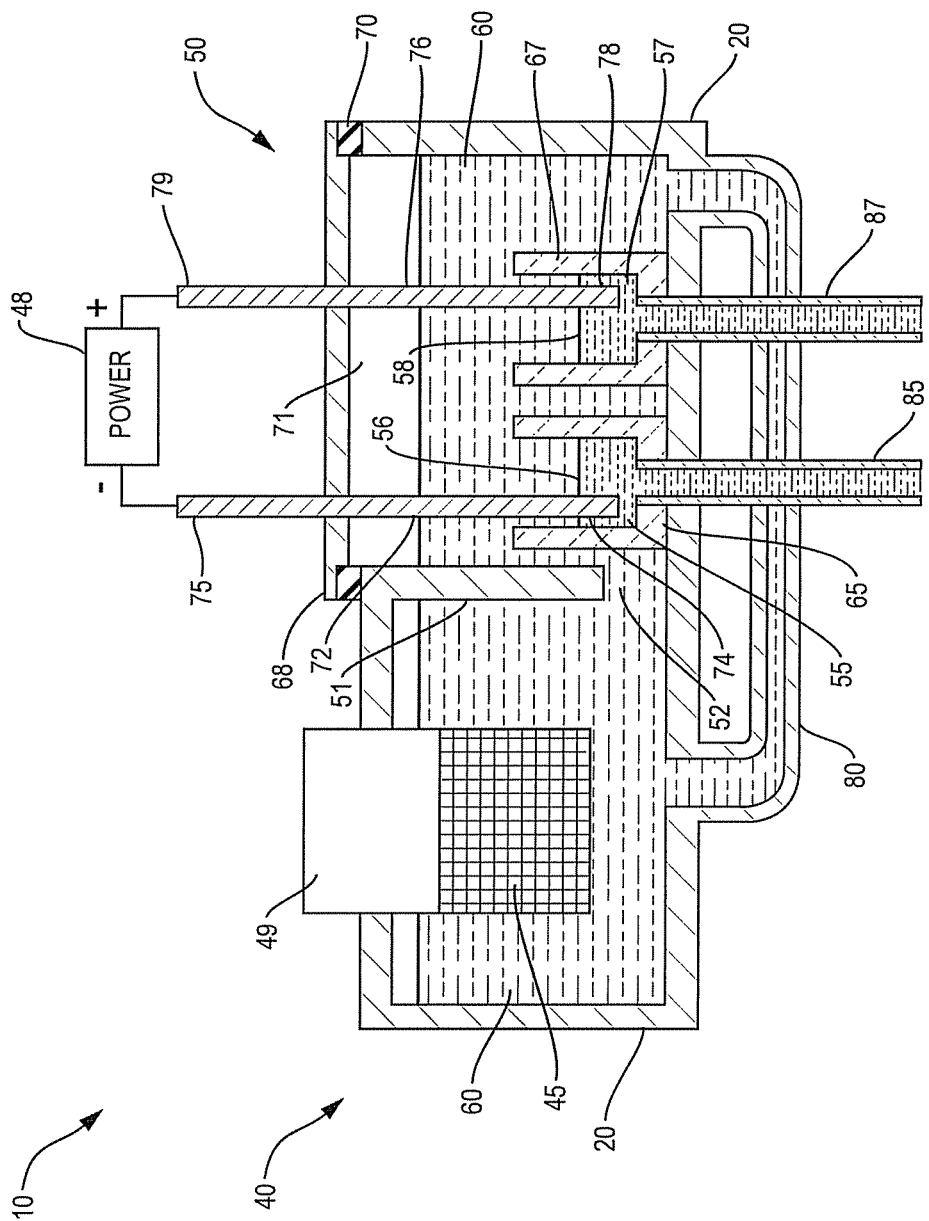
FIG. 1 is a vertical section showing an electrochemical apparatus configured to recover the component elements of a binary compound such as cadmium telluride in respective liquid phases, in accordance with the invention.

It will be appreciated that these figures are not necessarily drawn to scale.

DETAILED DESCRIPTION OF AN ILLUSTRATIVE EMBODIMENT

An electrolytic recycling method recovers at least one element of a plurality of elements combined in a compound comprising a first, more electropositive, component element and a second, more electronegative, component element. The first component element may be a metal. The second component element may be an electronegative metal or a metalloid, such as a chalcogen or pnicogen. The method may execute simultaneous reduction and oxidation to recover both the first and second component elements from a common electrolyte phase.

Illustratively, the compound is a compound semiconductor. The component elements may be from, e.g., columns 13 through 16 of the periodic table. For example, a compound semiconductor may be a II-VI compound—such as a telluride, selenide, or sulfide of a metal such as zinc or cadmium—or a III-V compound—such as a compound of a column-13 element such aluminum, gallium or indium with a column-15 element such as nitrogen, phosphorous, arsenic, antimony, or bismuth. Compound semiconductors may include two component elements in substantially equal mole fractions. Such binary compound semiconductors include, for example, aluminum antimonide, aluminum arsenide, aluminum arsenide, aluminum nitride, aluminum phosphide, gallium antimonide, gallium arsenide, gallium nitride, gallium phosphide, indium antimonide, indium arsenide, indium nitride, indium phosphide, cadmium selenide, cadmium sulfide, cadmium telluride, zinc selenide, zinc sulfide, and zinc telluride. Alternatively, compound semiconductors may include more than one element, distributed substitutionally on a sublattice and in aggregate functioning as the electropositive component or the electronegative component in the compound. Such ternary or higher-order semiconductor compounds are known to those skilled in the art.

In an illustrative method of recovering at least one of the first element and the second element combined in the compound, a negative electrode and a positive electrode are arranged with a liquid electrolyte filling space therebetween. The electrodes and the electrolyte are configured to form an electrolytic recycling cell in an electrical circuit with a power source. The compound to be recycled is dissolved in the electrolyte. Upon dissolution of the compound in the liquid electrolyte, the first element exists with a formal positive charge and the second element may exist with a formal negative charge in respective species in solution.

The power source is operated to pass an electrical current through the recycling cell by delivering electrons to the negative electrode and extracting electrons from the positive electrode. The electrical current drives electrolysis of the dissolved compound into component elements. Species in the electrolyte bearing the first element migrate to and are reduced at the negative electrode to produce the first element in a neutral state. Simultaneously species in the electrolyte bearing the second element migrate to and are oxidized at the positive electrode to produce the second element in a neutral state. The compound may thus be separated into its component first and second elements respectively at a negative electrode and a positive electrode respectively functioning as a cathode and an anode. Each of amounts of the first and second elements produced may be of purity exceeding 80%, 90%, 95%, 99%, 99.5% or greater.

The dissociation potential of the compounds to be recycled may be small, on the order of 1 volt. The actual voltage applied by the power source across terminals of the illustrative electrolytic recycling cell is influenced by the activities of the species bearing the component elements in the electrolyte, as expressed by the Nernst equation. The activities exhibit nonidealities which may be large, shifting the required voltage to values greater than 1 V.

Depending on the operating temperature of the electrolysis cell, the first and second elements produced by electrolysis may be in a gaseous or condensed phase. An element formed in a condensed phase may accrue to the negative or positive electrode.

In one approach, the cell is operated to form both first and second elements in liquid form. The first element in general has metallic properties in both its solid and liquid phases. The second element in general does not have metallic properties in the solid phase. However, the liquid-phase properties of the second element may be electronically conductive, thereby capacitating a liquid body thereof to function as an electrode in the illustrative recycling cell. Consequently, the illustrative electrolysis cell may be operated to deposit both the first and second elements on, effecting incorporation by, the respective electrodes at which they are formed. Accordingly, a liquid body constituting the negative electrode may be substantially of the first, electronically conductive component element, and a liquid body constituting the positive electrode may be substantially of the second component element. The liquid-phase electronic properties of the component elements enable their simultaneous recovery in respective liquid phases at electrodes of opposite polarity and continuous removal of the elements from the cell.

In another approach, during operation of the electrolytic recycling cell, the first element and/or the second element of the compound is deposited as a solid-phase material over a conductive substrate serving as a current collector of the respective electrode. If the deposit is adherent and electronically conductive, for example metallic, the deposited material may function as part of the electrode thereafter.

In one embodiment, during electrolysis one of the component elements is formed on the negative or positive electrode in the form of a gaseous phase which bubbles through and exits the liquid electrolyte, after which it may be recovered. One example of a component element for which this approach may be appropriate is arsenic, for example as the second element in gallium arsenide, or sulfur, for example in cadmium sulfide.

The electrolyte of the cell is in general a solvent, one or more supporting compounds and other, optional ingredients dissolved therein. The electrolyte is capable of dissolving the compound to be recycled. The solvent may be, for example, an ionic liquid existing at temperatures less than about 300° C., for example room temperature, or at elevated temperatures. In one embodiment, the illustrative electrolyte is a molten salt dissolving the compound to be recycled and one or more supporting compounds. In this case, the cell operating temperatures may be greater than 300° C., 400° C., 500° C., 700° C., or greater. The molten salt may include a halide, such as a chloride or iodide of the first element of the compound to be recycled.

The supporting compounds typically enhance the ionic conductivity and/or inhibit the electronic conductivity of the electrolyte. These and other ingredients of the electrolyte may further tailor its properties by, e.g., reducing its viscosity or vapor pressure, depressing its melting point, altering its density, providing complexing functionality to reduce the solubility of elemental components therein, or enhancing the solubility of the compound therein to optimize execution of the illustrative recycling method. The electrolyte ingredients illustratively have free energies of formation more negative than that of the compound to be recycled so that they electrodeposit at more extreme potentials, or at higher cell voltages, than that needed to electrolyze the compound to be recycled. Electrolysis products at the electrodes are thereby limited to the component elements desired to be recovered from the compound. These and other considerations informing the choice of electrolyte composition are known to those skilled in the art.

The compound to be recycled may be waste of high purity from a reactor in which the compound is deposited onto a device or other substrate. A quantity of the compound may be extracted from such a reactor, for example by scraping from an incidental deposit on the wall thereof, for dissolution in the electrolyte of the illustrative cell. In another approach, the compound to be recycled may be incorporated in an article of several parts. For example, the article may be a photovoltaic device or a radiation detector incorporating a compound semiconductor or be a portion of such a device or detector. After recovery by the illustrative method, the first and second component elements of the compound semiconductor may be used to fabricate a new body of the compound semiconductor. The new body may then be incorporated in a new photovoltaic device or radiation detector.

A multi-part article incorporating a compound to be recycled may comprise additional materials, such as a metal or glass, which are insoluble in the electrolyte of the illustrative electrolytic cell. All or part of the article may be introduced into a loading region of the electrolyte, the compound dissolving in the electrolyte and a permeable barrier such as a mesh filter being provided therein to prevent contact between insoluble material and the negative and positive electrodes. Illustratively the article is broken down into several smaller pieces such as by crushing before introducing it into the electrolyte. In another embodiment, the additional materials may be first removed from the article, for example by soaking in an appropriate medium, and the compound introduced into the electrolyte for recycling without the additional materials.

With reference to FIG. 1, an illustrative embodiment of an electrolytic apparatus 10 operable to recover a first element and a second element, in respective liquid phases, from a compound comprises a housing 20 enclosing a dissolution chamber 40 and a separation chamber 50. The chambers 40 and 50 are illustratively separated by a separating wall 51 and are in fluid communication through a break 52 in the separating wall 51 and a conduit 80.

In the separation chamber 50 are three liquid constituents: a cathodic liquid body 55 which is constituted to collect the first element and serve as negative electrode during operation of the apparatus 10; an anodic liquid body 57 which is constituted to collect the second element and serve as positive electrode; and an ionically conductive liquid electrolyte 60. The electrolyte 60 fills the separation chamber 50 sufficiently to cover the liquid bodies 55 and 57 and maintain respective electrolyte interfaces 56 and 58 therewith. A first open-top container 65 and a second open-top container 67 respectively hold the cathodic body 55 and the anodic body 57 separate from one another in the separation chamber 50. The liquid electrolyte 60 extends into the dissolution chamber 40 and fills the conduit 80.

The first container 65 and the second container 67 have respective apertured floors opening into a respective first removal conduit 85 and second removal conduit 87. The first removal conduit 85 is configured to convey an electrolysis product collected in the first container 65 out of the separation chamber 50. The second removal conduit 87 is configured to convey an electrolysis product collected in the second container 67 out of the separation chamber 50. The removal conduits 85 and 87 illustratively are fitted with control devices (not shown) such as valves to control the flow of the liquid electrolysis products through the removal conduits 85 and 87.

The separation chamber 50 is covered by a nonconductive lid 68. A seal 70 between the housing 20 and the lid 68 confines vapor that may originate in the cell constituents to the housing 20. An inert gas layer 71 overlays the electrolyte 60 to accommodate volume changes in the three-constituent system during electrolysis. Optionally, the lid 68 or seal 70 incorporates a safety pressure valve.

An electrically conductive rod 72 passes through and is suspended from the lid 68 and dips into the cathodic liquid body 55. The proximal end 74 of the rod 72 serves as the negative current collector for the electrolytic cell during operation of the apparatus 10. The distal end 75 of the rod 72 serves as the negative terminal of the electrolytic recycling cell. An electrically conductive rod 76 passes through and is suspended from the lid 68 and dips into the anodic liquid body 57. The proximal end 78 of the rod 76 serves as the positive current collector. The distal end 79 of the rod 76 serves as the positive terminal of the electrolytic recycling cell. The negative terminal 75 and the positive terminal 79 are connected to an external power source 48 operable to apply sufficient voltage between them to effect electrolysis of the compound, of the first and second elements, dissolved in the electrolyte 60.

In a variation, the separation chamber 50 may house a plurality of substantially identical pairs of respective cathodic bodies 55 and anodic liquid bodies 57. Each pair is connected to the power source 48 and simultaneously operable as described above to electrolyze the compound to be recycled from the electrolyte 60 for enhanced throughput of the apparatus 10.

The rods 72 and 76 may be configured in the electrolyte 60 to confine formation of the respective first and second elements substantially to the respective interfaces 56 and 58. In this way, recovery losses due to neutral elements forming on one of the rods 72 and 76 and failing to coalesce with the respective bodies 55 and 57 are limited. Illustratively, the rods 72 and 76 are sheathed in electrically insulating material (not shown) over the portions of their lengths that would otherwise be in contact with the electrolyte 60.

The housing 20, the electrode containers 65 and 67, the current collectors 74 and 78, and the sheathing for the rods 72 and 76, among other features, are illustratively of a material resistant to attack by the molten salt electrolyte 60 and/or liquid bodies 55 and 57. Cell constituents implemented in recycling some compounds may be compatible with glass, alumina, graphite or steel, for example. Selection criteria for such materials are known to those skilled in the art.

The dissolution chamber 40 is equipped with a mesh basket 45 for introducing the compound to be recycled into the electrolyte 60 without undesirable insoluble bodies. The basket 45 may have a solid portion 49 that seals against the housing 20 at the top of the dissolution chamber 40. The basket 45 is operable to be lowered into the dissolution chamber 40, the portion of the basket 45 submerged in the electrolyte 60 serving as the loading region therein. The dissolution chamber 40 may be equipped with apparatus (not shown) for evacuating/backfilling or applying a positive gas pressure over the electrolyte 60 in the dissolution chamber 40 to minimize the introduction of ambient into the dissolution chamber 40 during loading of the basket 45.

In a variation (not shown), the dissolution chamber 40 is further equipped with a second basket, similarly fitted in the top of the dissolution chamber 40, to allow loading of one basket with an additional quantity of the compound to be recycled while a first basket, previously loaded with material is deployed in the electrolyte 60. The housing 20 may furthermore incorporate or contain means (not shown) for increasing convection within the electrolyte 60. Methods and structures for generating convection in an electrochemical cell are described in copending U.S. patent application Ser. No. 12/839,130, which was filed on Jul. 19, 2010, by David J. Bradwell, et al. for a LIQUID ELECTRODE BATTERY, herein incorporated by reference in its entirety. In another variation (not shown), a single chamber fitted with one or more baskets 45 and the electrodes 55 and 57 functions as both the dissolution chamber 40 and the separation chamber 50.

In an exemplary process sequence effecting recycling of a chosen compound of at least first and second component elements, the apparatus 10 is assembled incorporating an electrolyte 60 capable of dissolving the chosen compound and first and second liquid bodies 55 and 57 capable of incorporating respectively the first and second component elements as described above. The basket 45 is opened and material including a quantity of the chosen compound is illustratively loaded therein. The basket 45 is positioned in the dissolution chamber 40 to submerge the quantity of the compound in the electrolyte 60. The chosen compound is thus dissolved in the electrolyte 60 and is thereafter present in the electrolyte 60 in the form of ions bearing the first component element and the second component element. Insoluble substances in the loaded material are retained in the basket 45.

The power source 48 is operated to deliver electrons through the rod 72 to the cathodic liquid body 55. The electrons act as reductant at the electrolyte interface 56 to form an amount of the first component element cathodically from the dissolved species in the electrolyte 60. The first component element formed accrues to the cathodic liquid body 55. Simultaneously the power source extracts electrons from the anodic liquid body 57 through the rod 76. Species in the electrolyte 60 are thereby oxidized at the electrolyte interface 58 to form an amount of the second component element anodically. The second component element formed accrues to the anodic liquid body 57. The respective amounts of the first and second component elements recovered from the dissolved compound by operation of the power source 48 are eventually removed from the separation chamber 50 through the first and second removal conduits 85 and 87 respectively. An additional quantity of the compound to be recycled may be introduced into the dissolution chamber 40 during operation of the power source 48 to effect a continuous recycling process.

In an embodiment of the electrolytic recycling apparatus 10 adapted to recycle cadmium telluride the separation chamber 50 contains a molten pool 55 of cadmium, a liquid pool 57 of tellurium and an electrolyte 60 based on cadmium chloride $CdCl_2$ and potassium chloride KCl. Illustratively, the electrolyte 60 is $CdCl_2$ and KCl in equal parts. Neutral cadmium metal has a very low solubility in $CdCl_2$—KCl mixtures. Cadmium telluride to be recycled is dissolved in the electrolyte 60. The operating temperature in the separation chamber is about 700° C. As the power source 48 drives current through the circuit, liquid cadmium and liquid tellurium are formed respectively at the respective interfaces 56 and 58 with the negative electrode 55 and the positive electrode 57. In an alternative chemistry, the electrolyte 60 is based on cadmium iodide $CdI_2$. The method produces elemental cadmium and tellurium in separate liquid phases.

In an electrolytic recycling apparatus 10 adapted to recycle zinc telluride the separation chamber 50 contains a molten pool 55 of zinc, a liquid pool 57 of tellurium and an electrolyte 60 based on zinc chloride $ZnCl_2$. The operating temperature in the separation chamber 50 is illustratively about 500° C. Zinc chloride dissolves on the order of 20 mole percent ZnTe at temperatures around 700° C. In an alternative chemistry, the electrolyte is based on zinc bromide $ZnBr_2$ or zinc iodide $ZnI_2$.

Figure 2:
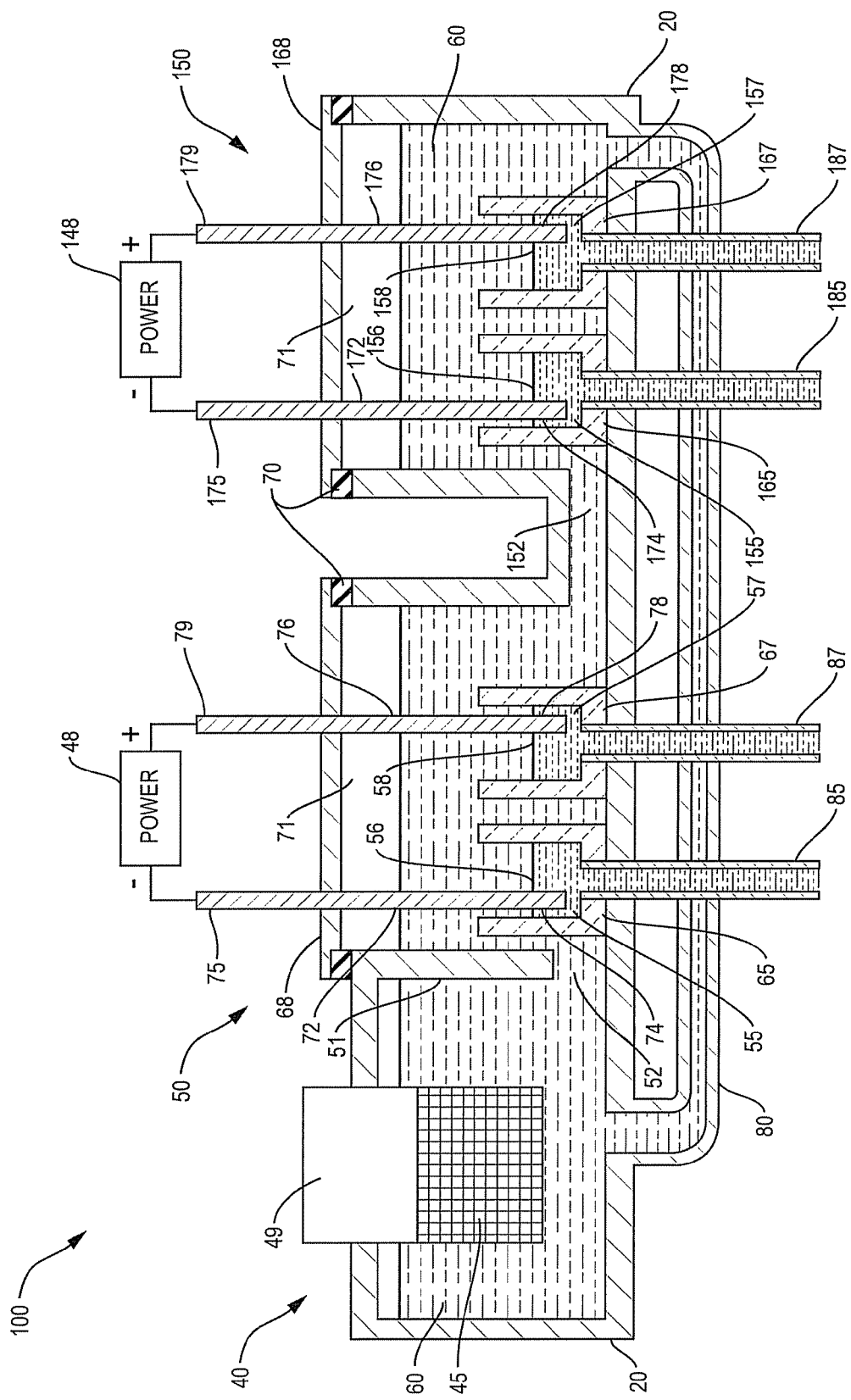
FIG. 2 is a vertical section showing an electrochemical apparatus configured to recover three component elements in respective liquid phases in accordance with the invention.

With reference to FIG. 2, an electrolytic recycling apparatus 100 is operable to recover a first component element, second component element and third component element, in respective liquid phases, of one or more compounds. The apparatus 100 comprises an additional separation chamber 150 supplementing the separation chamber 50 described in the electrolytic apparatus 10 (FIG. 1). The separation chamber 50 of the apparatus 100 (FIG. 2) is equipped as described above for FIG. 1. The additional separation chamber 150 (FIG. 2) is illustratively in fluid communication with the dissolution chamber 40 through the conduit 80 and with the separation chamber 50 through a neck 152. In the additional separation chamber 150 are an additional cathodic liquid body 155, constituted to collect the first element, and an additional anodic liquid body 157, constituted to collect the third element. The additional liquid bodies 155 and 157 are constituted to function analogously to the cathodic liquid body 55 and the anodic liquid body 57 respectively. The ionically conductive liquid electrolyte 60 extending from the separation chamber 50 fills the additional separation chamber 150 sufficiently to cover the liquid bodies 155 and 157 and maintain respective electrolyte interfaces 156 and 158 therewith. A third open-top container 165 and a fourth open-top container 167 respectively hold the additional cathodic body 155 and the additional anodic body 157 separate from one another in the additional separation chamber 150.

The third container 165 and the fourth container 167 have respective apertured floors opening into a respective third removal conduit 185 and fourth removal conduit 187. The third removal conduit 185 is configured to convey an electrolysis product collected in the third container 165 out of the additional separation chamber 150. The fourth removal conduit 187 is configured to convey an electrolysis product collected in the fourth container 167 out of the additional separation chamber 150. The removal conduits 185 and 187 illustratively are fitted with valves (not shown) to control the flow of the liquid electrolysis products through the removal conduits 185 and 187. The additional separation chamber 150 is covered by a nonconductive lid 168 constituted as described above for the lid 68 (FIG. 1).

An electrically conductive rod 172 (FIG. 2) passes through and is suspended from the lid 168 and dips into the additional cathodic liquid body 155. The proximal end 174 of the rod 172 serves as the negative current collector in the additional separation chamber 150 during operation of the apparatus 100. The distal end 175 of the rod 172 serves as the negative terminal of the electrolytic recycling cell in the additional separation chamber 150. An electrically conductive rod 176 passes through and is suspended from the lid 68 and dips into the additional anodic liquid body 157. The proximal end 178 of the rod 176 serves as the positive current collector. The distal end 179 of the rod 176 serves as the positive terminal of the electrolytic recycling cell. The negative terminal 175 and the positive terminal 179 are connected to an additional external power source 148 operable to apply sufficient voltage between them to produce the first and third elements from species in the electrolyte 60. The rods 172 and 176 are illustratively sheathed as described above in connection with the rods 72 and 76 (FIG. 1).

In an illustrative recycling process sequence using the apparatus 100, feed material including two distinct binary compounds, a primary compound and a secondary compound, is introduced into the dissociation chamber 40. As used herein with respect to compounds, primary and secondary are intended as labels to aid easy distinction between two compounds treated in the illustrative method and do not indicate differences in, for example, importance or abundance. Both the primary compound and the secondary compound include the same first, relatively electronegative, component element. The primary compound includes a second component element more electropositive than the first component element. The secondary compound includes a third component element, distinct from the second component element, more electropositive than the first component element. The secondary compound illustratively has a higher decomposition voltage than the primary compound. The two binary compounds are illustratively loaded into the basket 45 and then immersed in the electrolyte 60. The dissolved species bearing the component elements travel into the separation chamber 50 and the additional separation chamber 150 by convection.

The power source 48 associated with the separation chamber 50 of the apparatus 100 is operated as described above in relation to FIG. 1 to electrolyze the primary compound and collect respective amounts of the first and second elements in the respective cathodic liquid body 55 (FIG. 2) and anodic liquid body 57 and convey the produced neutral elements out the separation chamber 50. The electrolysis in the separation chamber 50 of the apparatus 100 illustratively depletes the electrolyte 60 of dissolved species bearing the second component element before it reaches the additional separation chamber 150.

The additional power source 148 is operated to electrolyze the secondary compound. Electrons are delivered to the additional cathodic body 155 thereby forming an additional amount of the first element at the interface 156. The additional amount accrues to the additional cathodic body 155 and is eventually conveyed out of the additional separation chamber 150 through the third removal conduit 185. Electrons are extracted from the additional anodic body 157 thereby forming an amount of the third element at the interface 158. The amount of the third component element accrues to the additional anodic body 157 and is conveyed out of the additional separation chamber 150 through the fourth removal conduit 187.

The apparatus 100 may equivalently be operated to recover three elements from a ternary compound having a substitutional solution of the second and third elements on the metalloid sublattice. Alternatively the apparatus 100 may be modified for recovering three elements, two metals and one metalloid, from one or more compounds by configuring one of the electrode bodies in each of the separation chambers 50 and 150 to collect a common metalloid and the other electrode body in each of the chambers 50 and 150 to collect distinct metallic elements.

In an embodiment of the electrolytic recycling apparatus 100 adapted to recycle cadmium telluride and cadmium sulfide simultaneously, the liquid constituents in the separation chamber 50 are as described above for the apparatus 10 (FIG. 1) configured for cadmium telluride recycling. The additional anodic liquid body 157 (FIG. 2) in the additional separation chamber 150 is liquid sulfur. The method produces cadmium, tellurium and sulfur in distinct liquid phases. The operating temperature of the liquid constituents in the separation chamber 50 of the apparatus 100 is illustratively about 700° C. In order to recover the sulfur ($T_b \approx 445°$ C.) in liquid form, the operating temperature of the liquid constituents in the additional separation chamber 150 is lower, illustratively about 400° C.

Figure 3:
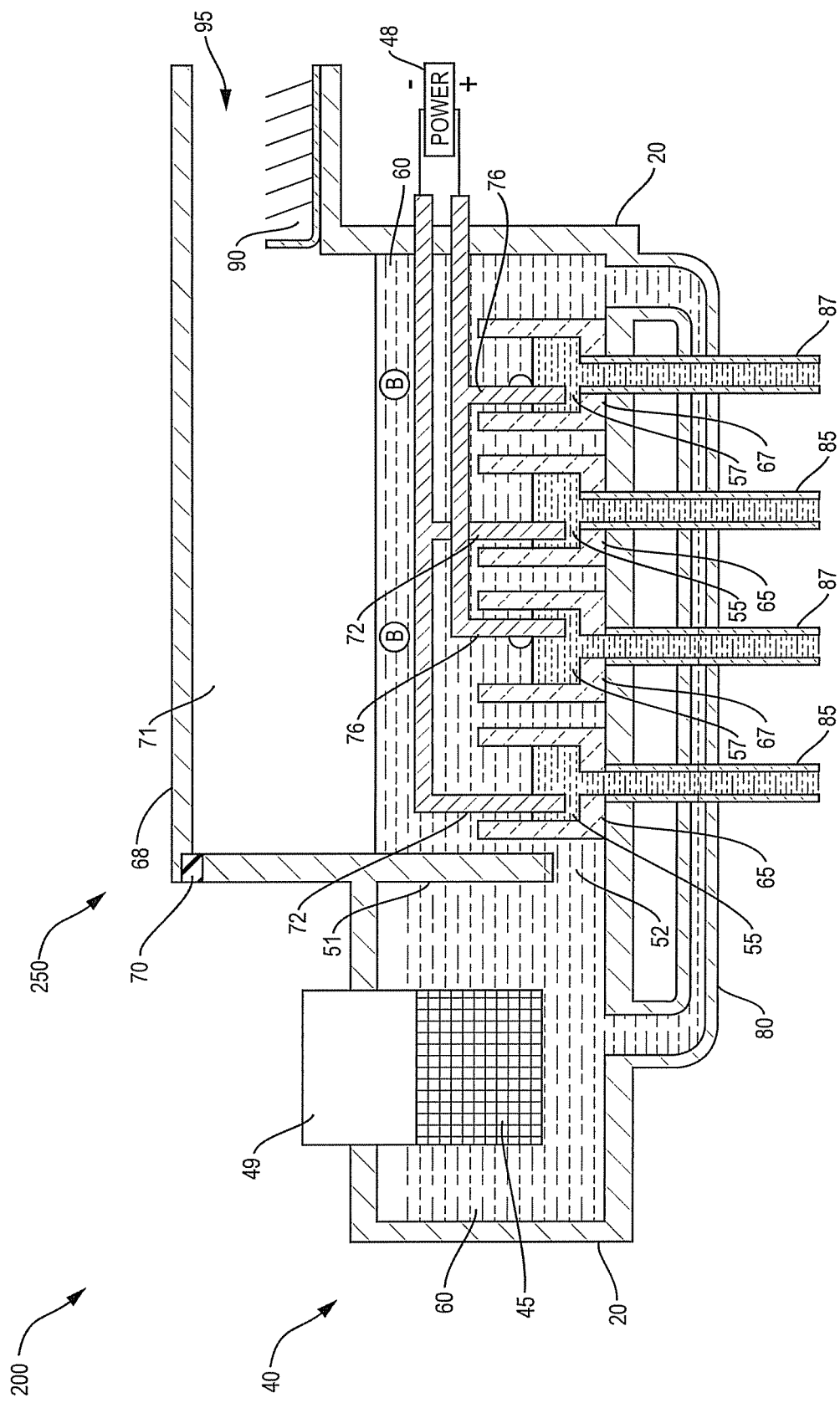
FIG. 3 is a vertical section showing an electrochemical apparatus configured to produce three component elements in respective liquid phases and a gaseous phase in accordance with the invention.

With reference to FIG. 3, an electrolytic recycling apparatus 200 is operable to recover two liquid elements and one element in a gaseous phase from one or more compounds. The apparatus 200 has a dissolution chamber 40 and a single separation chamber 250. In the separation chamber 250 are a plurality of substantially identical pairs of electrodes. Each pair includes a cathodic liquid body 55 and an anodic liquid body 57 forming form respective electrolyte interfaces 56 and 58 with the electrolyte 60 as described above in relation to FIG. 1. The electrodes 55 (FIG. 3) and 57 have respective associated apertured containers 65 and 67, removal conduits 85 and 87, rods 72 and 76, current collectors 74 and 78, terminals 75 and 79 and power source 48 as described above for the separation chamber 50 of the apparatus 10 (FIG. 1). The power source 48 (FIG. 3) is operable to apply sufficient voltage between a paired cathodic body 55 and anodic body 57 of the apparatus 200 to recover the first, second and third elements dissolved in the electrolyte 60. The separation chamber 250 is illustratively equipped with a condenser 90 between the electrolyte 60 and an outlet 95. The condenser 90 is illustratively maintained at a temperature within the liquid range of the third component element. The outlet 95 permits removal of liquefied third element from the condenser 90 during operation of the power source 48 to recover the component elements from the electrolyte 60. The outlet 95 may be equipped with control devices (not shown) such as valves.

The rods 76 dipping into the anodic liquid bodies 57 in the apparatus 200 are bare, in direct contact with the electrolyte 60, over a least some of their vertical portions. Illustratively each of the vertical portions are sheathed as described above for FIG. 1 except for over a short length close to each interface 56 (FIG. 3). The horizontal portions of the rods 76 are sheathed to limit electrical contact with the electrolyte 60. The rods 72 dipping into the cathodic liquid bodies 55 are sheathed as described above for FIG. 1. The rods 76 (FIG. 3) are constituted to accept electrons from the respective anodic liquid bodies 57 during electrolysis in the separation chamber 250, at the respective distal ends 79, as already described. The rods 76 also are configured to accept electrons along their unsheathed portions from anionic precursors oxidizable to form gaseous species. The rods 76 may provide a catalytic surface for the evolution of gaseous bubbles in the electrolyte 60.

In an exemplary process sequence effecting recycling of two binary compounds to recover three elements in the apparatus 200, the first, second and third component elements are illustratively related to one another in the compounds as described above the exemplary process sequence executable by the apparatus 100 (FIG. 2). The feedstock containing the primary and secondary compounds of interest is introduced into the electrolyte 60 (FIG. 3) in the dissolution chamber 40 as described above for other embodiments. The power source 48 is operated to deliver electrons through the rods 72 to the cathodic liquid bodies 55 and extract electrons through the rods 76 from the anodic liquid bodies 57. The power source 48 applies a potential between the respective negative terminals 75 and positive terminals 79 sufficient to effect electrolysis of both the primary and secondary compounds dissolved in the electrolyte 60.

An amount of the first component element is formed cathodically and an amount of the second component element is formed anodically from the dissolved species in the electrolyte 60 at the respective interfaces 56 and 58 and eventually conveyed as liquids from the electrodes 55 and 57 as described above for the apparatus 10 (FIG. 1) and 100 (FIG. 2). Above the anodic liquid bodies 57, an amount of the third component element is generated at the surface of the rods 76 with transfer of electrons from ionic precursors through the rods 76 to the power source 48. Bubbles B of the gaseous element float from the rods 76 through the electrolyte 60 toward the lid 68. The amount of the third element enters the gas phase above the electrolyte 60 and is eventually conveyed into the condenser 90 where it undergoes transition to a liquid phase and is removed from the chamber 250 through the outlet 95.

The electrolytic recycling apparatus 200 may be operated to execute a process sequence recycling cadmium telluride and cadmium sulfide simultaneously. Liquid cadmium and tellurium are recovered as described relating to the apparatus 100. Gaseous sulfur is formed on unsheathed portions of the rods 76 and recovered through the condenser 90. The operating temperature of the liquid cell constituents in the separation chamber 250 is illustratively about 700° C. Recovering the sulfur ($T_m \approx 115°$ C. and $T_b \approx 445°$ C.) in the gaseous phase allows the electrolyte 60 in the apparatus 200 to be maintained at a higher operating temperature than is consistent with electrolytic formation of sulfur in a liquid phase. The higher operating temperature enhances solubility of the binary compounds in the electrolyte 60.

The illustrative electrolytic recycling apparatus 10, 100 and 200 are not limited to any particular method of being brought to or remaining at operating temperature. During initial cell assembly, a liquid constituent such as the electrolyte may be initially melted in a separate heated chamber with sufficient superheat to allow transfer to the housing of the electrolytic cell. In another approach external heaters are used before or during operation, placed, for example, in the cell housing wall. Or, the liquids in the separation chamber 50, 150 or 250 may be self-heating during operation through applied overpotentials. Techniques for achieving and maintaining operating temperatures of molten constituents are known to those skilled in the art.

Practical aspects of electrometallurgical systems potentially helpful to implementation of the illustrative method and apparatus, such as construction of high-temperature apparatus for containing molten salts and liquid metals, and management of temperature profiles in their use, are known to those skilled in the art.

Although specific features are included in some embodiments and drawings and not in others, it should be noted that each feature may be combined with any or all of the other features in accordance with the invention.

It will therefore be seen that the foregoing represents a highly advantageous approach to recycling multi-elemental materials, particularly compound semiconductors useful in photovoltaic devices or radiation detectors. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of recovering an element, the method comprising:
    dissolving a compound having a first element and a second element in a liquid electrolyte contained in a housing, the liquid electrolyte comprising a molten salt, an ionic liquid, or combinations thereof;
    electrolyzing the compound in the electrolyte to form an amount of the first element as a liquid by reduction at a first negative electrode and an amount of the second element as a liquid by oxidation at a first positive electrode simultaneously, the first negative and positive electrodes being in the housing, each in contact with the electrolyte; and
    removing the amount of the first element and the amount of the second element from the housing.

2. The method of claim 1 wherein the quantity of the compound is incorporated in a multi-part article and further comprising placing the article into the electrolyte.

3. The method of claim 2 wherein the article is a photovoltaic device or a portion thereof.

4. The method of claim 2 wherein the article comprises a metallic phase.

5. The method of claim 2 wherein the article comprises glass.

6. The method of claim 2 wherein the article comprises material insoluble in the electrolyte and further comprising providing a barrier in the electrolyte preventing contact between the insoluble material and the first positive and negative electrodes.

7. The method of claim 1 wherein the compound is a compound semiconductor.

8. The method of claim 1 further comprising fabricating a new batch of the compound using the amount of the first element or the amount of the second element.

9. The method of claim 1, wherein the first negative electrode, first positive electrode and liquid electrolyte are each at a temperature greater than 500° C. at an operating temperature.

10. The method of claim 1 wherein the amount of the first element and the amount of the second element are removed from the housing during simultaneous generation of the first element and the second element in respective neutral states at the first negative electrode and the first positive electrode respectively.

11. The method of claim 1 wherein an additional quantity of the compound is added to the electrolyte during simultaneous generation of the first element and the second element in respective neutral states at the first negative electrode and the first positive electrode respectively.

12. The method of claim 1 wherein the first element is cadmium and the second element is tellurium.

13. The method of claim 1 wherein the first element is gallium, indium, aluminum, or combinations thereof.

14. The method of claim 1 wherein the second element is tellurium, selenium, sulfur, or combinations thereof.

15. The method of claim 1 wherein the second element is arsenic, antimony, or combinations thereof.

16. The method of claim 1 wherein the amount of the first element removed from the housing contains less than 1% impurity by weight.

17. The method of claim 1 wherein the amount of the second element removed from the housing contains less than 1% impurity by weight.

18. The method of claim 1, wherein the electrolyte includes a halide salt of the first element.

19. The method of claim 1, wherein removing the amount of the first element and the amount of the second element from the housing includes:
    removing the amount of the first element from the housing through a first removal conduit; and
    removing the amount of the second element from the housing through a second removal conduit.

20. A method of recovering cadmium and tellurium from cadmium telluride, the method comprising:
    dissolving the cadmium telluride in a liquid electrolyte, contained in a housing, to form respective species bearing cadmium and tellurium, the liquid electrolyte comprising a molten salt, an iconic liquid, or combinations thereof;
    electrolyzing the cadmium telluride dissolved in the electrolyte to form an amount of cadmium as a liquid by reduction at a first negative electrode and an amount of tellurium as a liquid by oxidation at a first positive electrode simultaneously, the first negative electrode and the first positive electrode being in the housing, each in contact with the electrolyte; and
    removing the amount of cadmium and the amount of tellurium from the housing.

21. The method of claim 20 further comprising:
    dissolving a quantity of cadmium sulfide in the liquid electrolyte; and
    electrolyzing the cadmium sulfide dissolved in the electrolyte to form an additional amount of cadmium by reduction at the first negative electrode and an amount of sulfur anodically.

22. The method of claim 21, wherein the amount of sulfur is formed on a second positive electrode in contact with the electrolyte.

23. The method of claim 21, wherein the housing contains the first negative electrode and the first positive electrode in a first chamber and a second negative electrode and a second positive electrode in a second chamber in fluid communication with the first chamber and the additional amount of cadmium is formed on the second negative electrode and the amount of sulfur is formed on the second positive electrode.

24. The method of claim 21, wherein the amount of sulfur is formed on a conductive body joining a power source and the first positive electrode.

25. The method of claim 20 wherein the electrolyte includes a cadmium halide.

26. The method of claim 20, wherein removing the amount of cadmium and the amount of tellurium from the housing includes:

removing the amount of the cadmium from the housing through a first removal conduit; and removing the amount of the tellurium from the housing through a second removal conduit.

* * * * *

UNITED STATES PATENT AND TRADEMARK OFFICE
CERTIFICATE OF CORRECTION

PATENT NO.         : 9,605,354 B2
APPLICATION NO.    : 13/194391
DATED              : March 28, 2017
INVENTOR(S)        : David J. Bradwell et al.

It is certified that error appears in the above-identified patent and that said Letters Patent is hereby corrected as shown below:

In the Claims

In Column 12, Line 32:
Replace "iconic"
With "ionic"

Signed and Sealed this
Ninth Day of May, 2017

Michelle K. Lee
*Director of the United States Patent and Trademark Office*